Oct. 9, 1962 W. KOHLMEIER 3,057,072
GAUGE PROTECTOR
Filed June 9, 1959
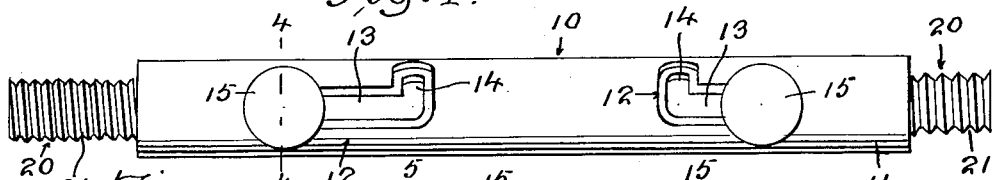
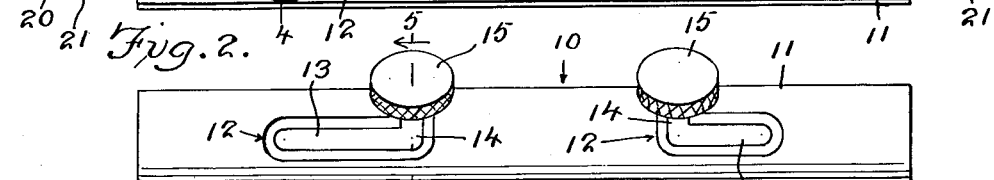
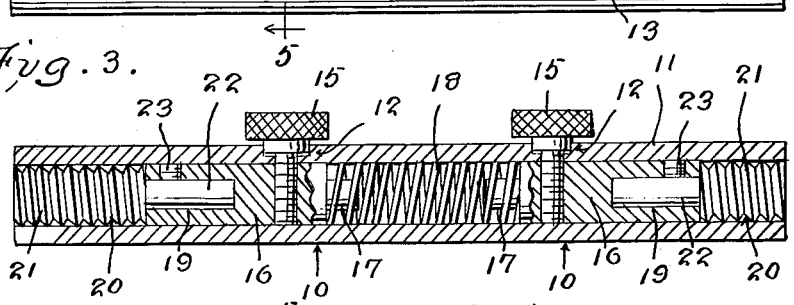
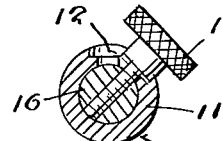 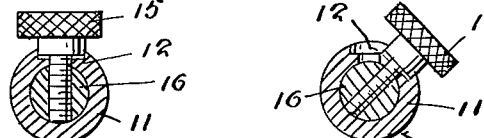
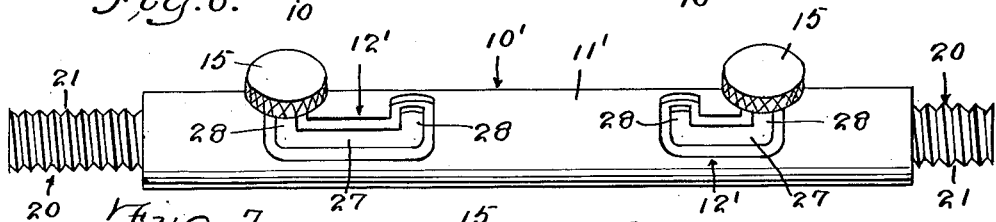
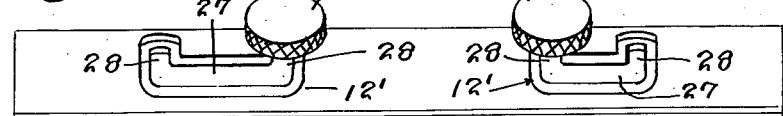
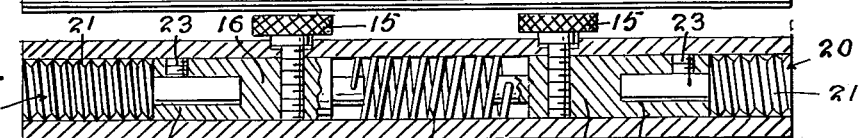
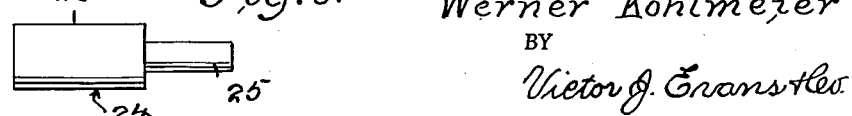
INVENTOR.
Werner Kohlmeier
BY
Victor J. Evansteo
ATTORNEYS

# United States Patent Office 3,057,072
Patented Oct. 9, 1962

3,057,072
GAUGE PROTECTOR
Werner Kohlmeier, Santa Monica, Calif.
Filed June 9, 1959, Ser. No. 819,045
1 Claim. (Cl. 33—178)

This invention relates to a protecting device, and more particularly to a gauge protector.

The object of the invention is to provide a device which is adapted to be used for protecting a gauge such as a thread or plug gauge so as to prevent damage to such a gauge.

Another object of the invention is to provide a gauge protector which includes means for moving the gauges to extended or retracted position as desired.

A further object of the invention is to provide a gauge protector which is extremely simple and inexpensive to manufacture.

Other objects and advantages will be apparent during the course of the following description.

In the accompanying drawings, forming a part of this application, and in which like numerals are used to designate like parts throughout the same:

FIG. 1 is an elevational view of the gauge protector of the present invention, and showing the gauges in extended position.

FIG. 2 is a view similar to FIG. 1, with the gauges in retracted position.

FIG. 3 is a longitudinal sectional view taken through the gauge protector, and showing the gauges in retracted position as in FIG. 2.

FIG. 4 is a sectional view taken on the line 4—4 of FIG. 1.

FIG. 5 is a sectional view taken on the line 5—5 of FIG. 2.

FIG. 6 is an elevational view illustrating a modification, and with the gauges in extended position.

FIG. 7 is a view similar to FIG. 6, with the gauges in retracted position.

FIG. 8 is a longitudinal sectional view illustrating the gauge protector of FIGS. 6 and 7 and showing the gauges in retracted position.

FIG. 9 is an elevational view of a plug gauge which can be used instead of a thread gauge.

Referring in detail to the drawings, and more particularly to FIGS. 1 through 5 of the drawings, the numeral 10 indicates a gauge protector which includes a hollow cylindrical housing 11 that has its ends open. The housing 11 is provided with L-shaped slots or cutouts 12, and as shown in FIG. 1 for example, each of the slots 12 includes a main straight portion 13 as well as a right angularly arranged portion 14.

The numeral 15 indicates lock screws which extend through the slots 12 and engage carriages 16, there being a pair of the carriages 16 adjustably or movably mounted in the housing 11. Guide pin 17 extends inwardly from each carriage 16, and a resilient means or coil spring 18 is interposed between the pair of carriages 16, the spring 18 engaging the guide pins 17.

Each of the carriages 16 is provided with an elongated bore or opening 19. The numeral 20 designates each of a pair of gauges, and the gauges 20 are shown to comprise a threaded portion 21 as well as a reduced diameter end portion or shank 22 which is seated in the bore 19. A set screw 23 extends through the carriage 16 and engages the shank 22 so as to maintain the gauge 20 connected to the carriage 16. By loosening the set screw 23, the gauge 20 can be removed and replaced for example with a plug gauge such as the plug gauge 24 of FIG. 9. The plug gauge 24 is shown to comprise a smooth portion 26 as well as a reduced diameter shank portion 25.

Referring now to FIGS. 6, 7 and 8 of the drawings, there is illustrated a modified gauge protector which is indicated generally by the numeral 10', and the gauge protector 10' includes a hollow elongated housing 11' which is provided with a pair of spaced apart U-shaped slots 12' therein. The slots 12' include a main straight portion 27 as well as right angularly arranged end portions 28. The gauge protector 10' further includes carriages 16 which have a resilient means such as the coil spring 18' therebetween, and gauges such as the gauges 20 or 24 are adapted to be connected to the carriages 16 in the same manner as previously described.

From the foregoing, it is apparent that there has been provided a gauge protector, and in use when the gauges 20 are not being used, the parts can be arranged as shown in FIGS. 2 and 3 for example so that the threaded portions 21 are entirely within the housing 11 whereby damage to the threaded portions 21 of the gauges 20 will be prevented. When the gauges 20 are to be used, the lock screw 15 can be moved in the slot 12 so that the spring 18 can urge the carriage 16 outwardly whereby the gauge 20 will move from the position shown in FIGS. 2 and 3 to the position shown in FIG. 1 so that the threaded portion 21 of the gauge can be used for any desired purpose as for example when working in a machine shop or the like.

The spring 18 can be used for urging either one or both of the carriages 16 and associated gauges 20 outwardly, or else only one of the gauges 20 can be urged outwardly by the spring 18. When the lock screw 15 is in the position of FIG. 2, it will be seen that the shoulder or portion 14 of the slot 12 will prevent the spring 18 from urging the carriage and gauge outwardly. To release the gauge and carriage, it is only necessary to manually move the lock screw 15 until it clears or moves out of the portion 14 of the slot 12.

The gauge 20 is held in the carriage 16 by means of the set screw 23, and by loosening the set screw, the gauge can be replaced as desired.

Instead of using the gauge such as the gauge 20 which has the threaded portion 21, a gauge such as the plug gauge 24 which has the smooth portion 26 may be connected to the carriage by means of a set screw such as the set screw 23.

In the modification of FIGS. 6, 7 and 8, the slots 12' are of substantially U-shaped formation, with the legs thereof extending circumferentially of housing 11. The ends of spring 18', as best seen in FIGURE 8, are anchored to the respective guide pins 17, and the spring 18' is of the type to normally draw the carriages 16 inwardly instead of urging them outwardly as is the case with the previously described spring 18. By positioning the lock screw 15 in engagement with either of the right angularly arranged end portions 28, the carriages 16 and gauges connected thereto will be held immobile in their adjusted positions.

As previously stated, the present invention can be used for protecting a plug gauge as well as a thread gauge. The outer surface of the housing may be knurled or roughened so as to facilitate handling or gripping thereof.

The gauge protector of the present invention will serve to protect thread and plug gauges of various sizes against damage. These gauges, which are made for the purpose of checking close tolerances, are constructed so that any kind of damage to these gauges makes accuracy impossible. The gauge protector of the present invention will prevent such damage since when the gauges are not in use as for example when they are lying on a work bench, or being stocked, stored or shipped, they will always be protected by the gauge housing 11 or 11'. The gauge protector utilizes a spring action. When using the pressure spring 18, by moving the lock screw 15, the gauge carriage will be released and the gauge will spring out of the housing. It is to be noted that the lock screws 15 threadedly engage the carriages 16, so that by rotating the lock screws 15 in the proper direction, the carriages 16 can be automatically released or locked as desired. In the modification of FIGS. 6, 7 and 8, when the lock screw 15 is released, the spring 18' will pull the carriage back into the housing. The lock screws also serve to guide the gauge carriages as well as providing a locking means therefor.

Minor changes in shape, size and rearrangement of details coming within the field of invention claimed may be resorted to in actual practice, if desired.

What is claimed is:

In a gauge protector, a hollow cylindrical housing having its ends open, there being a pair of spaced apart U-shaped slots formed in said housing, with the legs thereof extending circumferentially thereof, a pair of carriages slidably carried in said housing, aligned guide pins, one integral with the inner end of each carriage and extending inwardly toward the other, lock screws extending through said slots and connected to said carriages, a tension spring arranged in said housing and interposed between the pair of carriages in circumjacent contactual relation with each of said guide pins and anchored at its ends thereto, the outer end of each carriage being provided with an elongated bore, a gauge having a reduced shank portion selectively seated in each of said bores, and set screws extending through said carriages and engaging said shank portions.

References Cited in the file of this patent

UNITED STATES PATENTS

| 1,329,456 | Carpenter | Feb. 3, 1920 |
| 1,339,573 | Pettibone | May 11, 1920 |
| 1,431,615 | Wittner | Oct. 10, 1922 |
| 2,861,347 | Von Tarnik | Nov. 25, 1958 |

FOREIGN PATENTS

| 161,349 | Great Britain | Apr. 14, 1921 |
| 58,771 | France | Nov. 25, 1953 |